INVENTOR.
John Hart Wilson
BY
Wayland D. Keith
HIS AGENT.

March 12, 1957  J. H. WILSON  2,784,557
ENGINE COMPOUND FOR DRILLING RIGS
Filed April 17, 1951  7 Sheets-Sheet 2
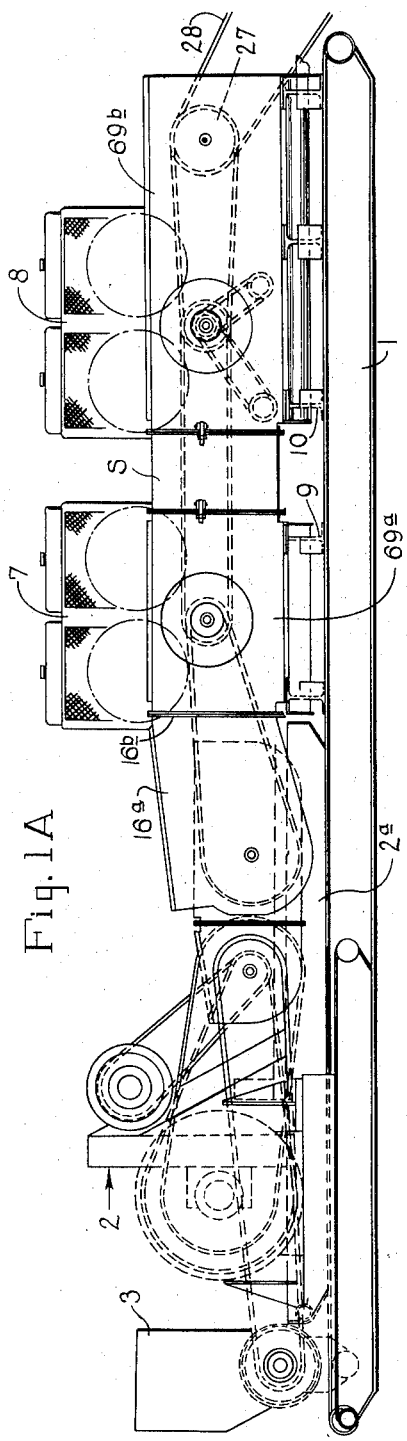
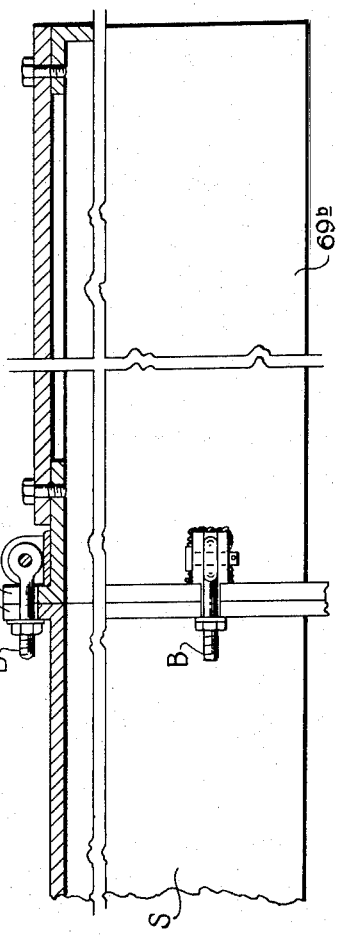
John Hart Wilson
INVENTOR.
BY
Wayland D. Keith
HIS AGENT.

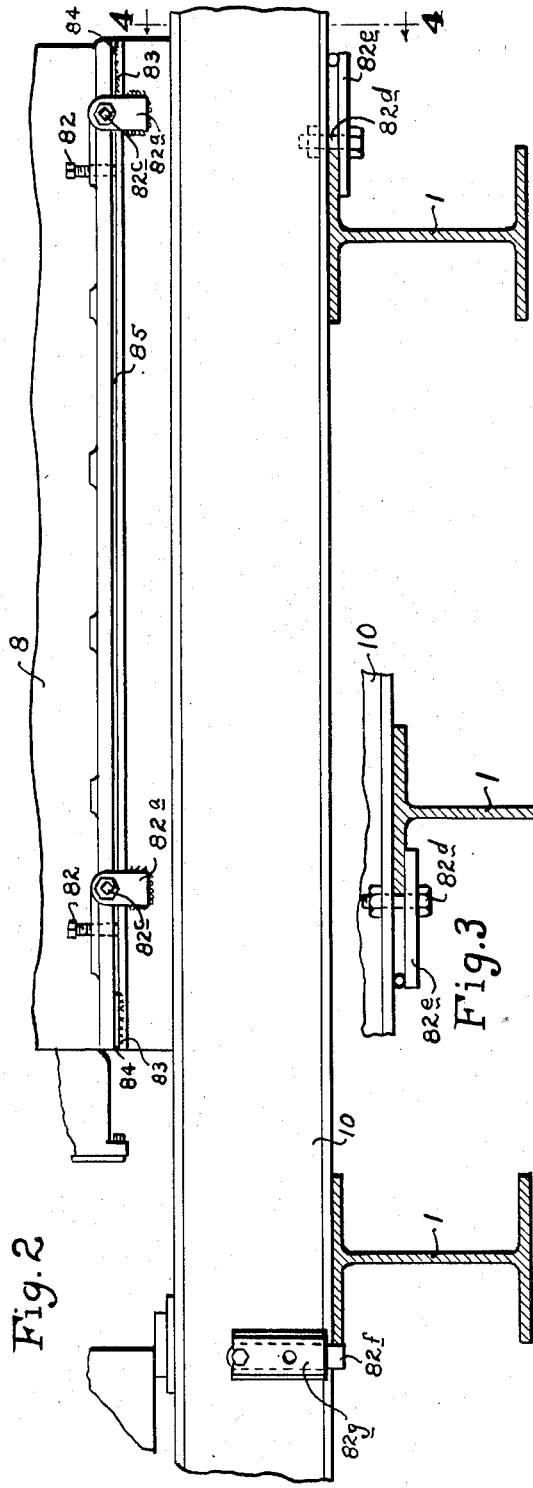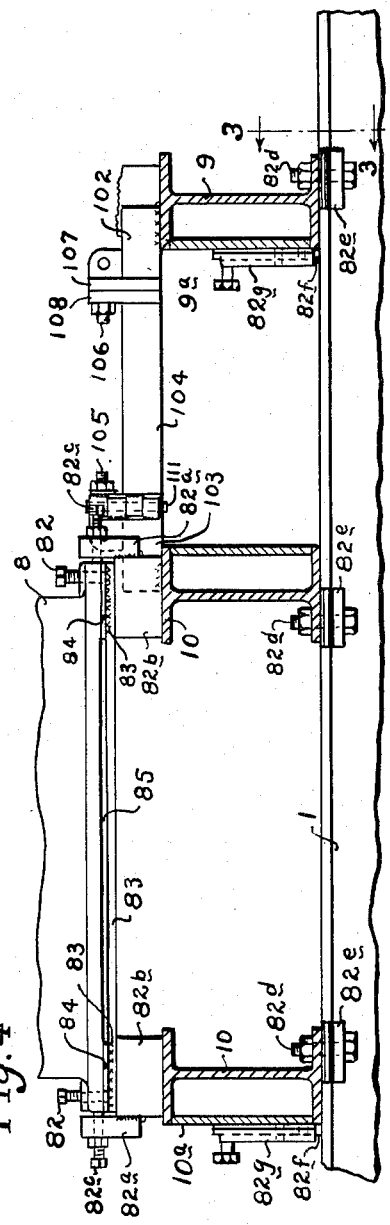

March 12, 1957  J. H. WILSON  2,784,557
ENGINE COMPOUND FOR DRILLING RIGS
Filed April 17, 1951  7 Sheets-Sheet 4
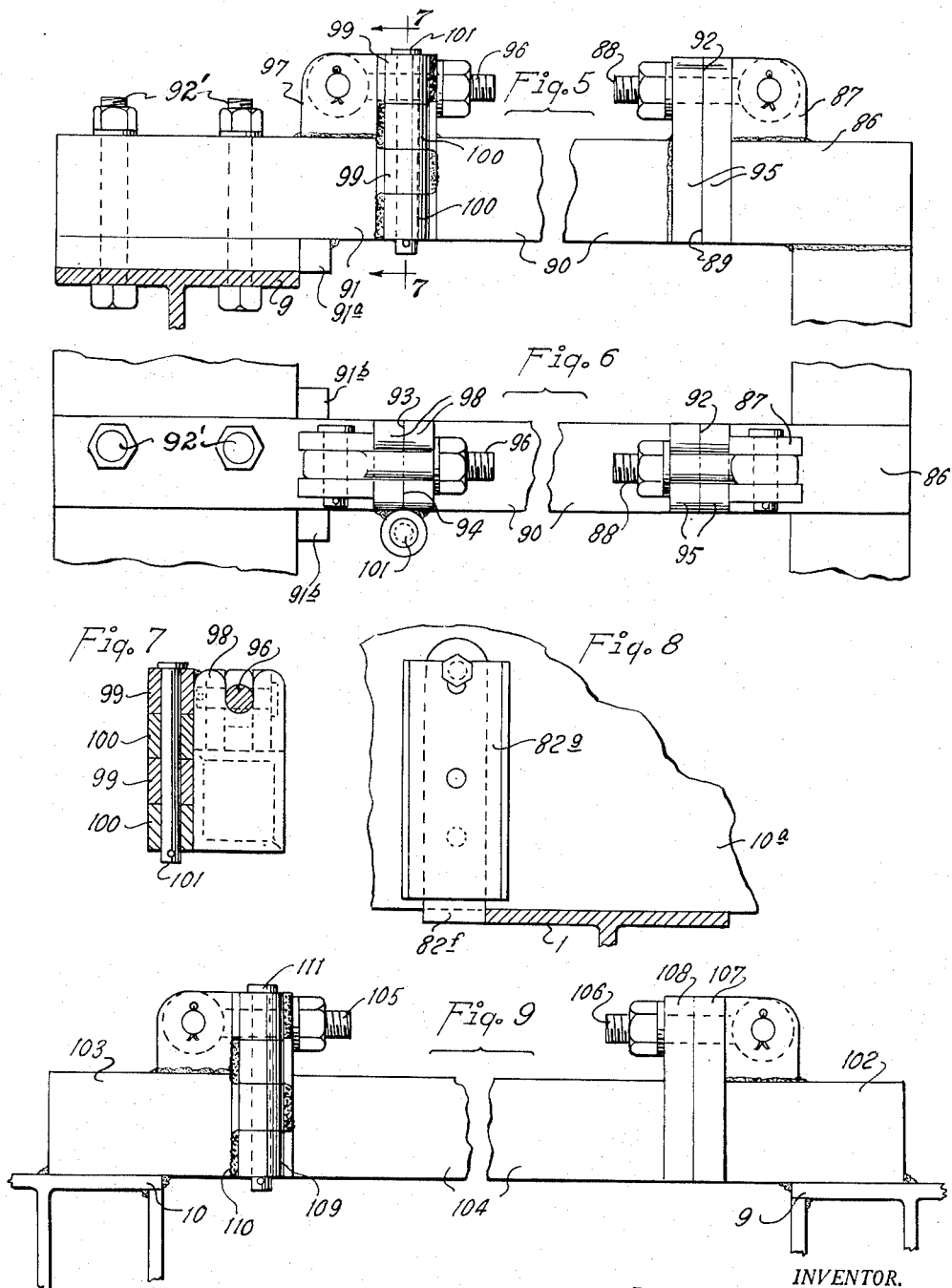
INVENTOR.
John Hart Wilson
BY
Wayland D. Keith
HIS AGENT

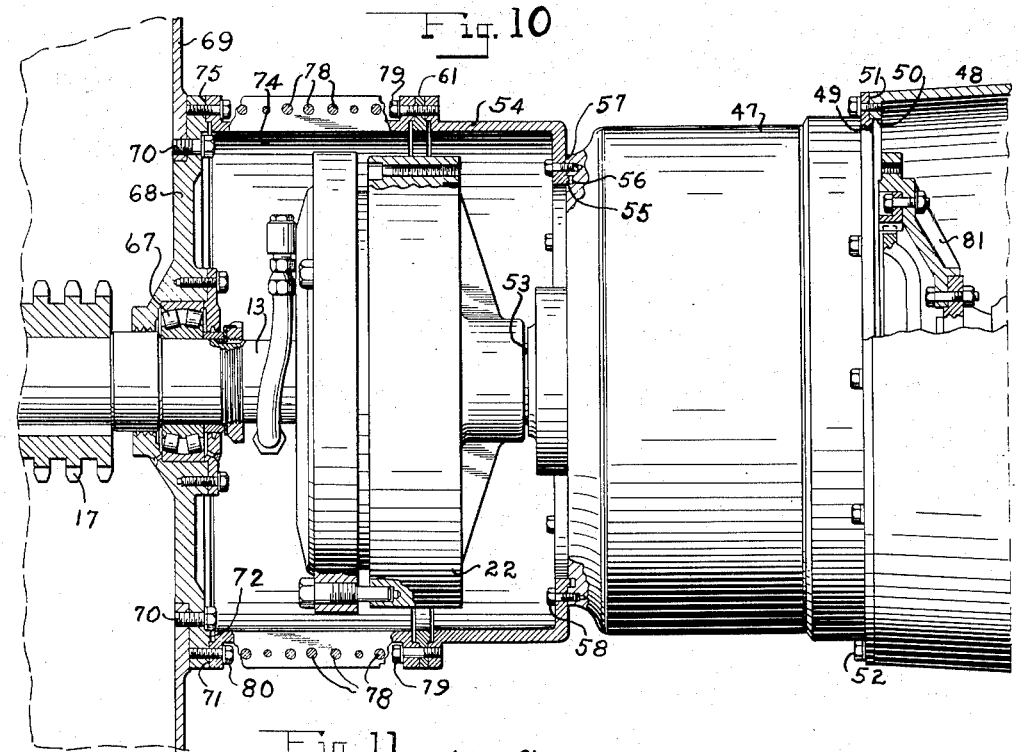
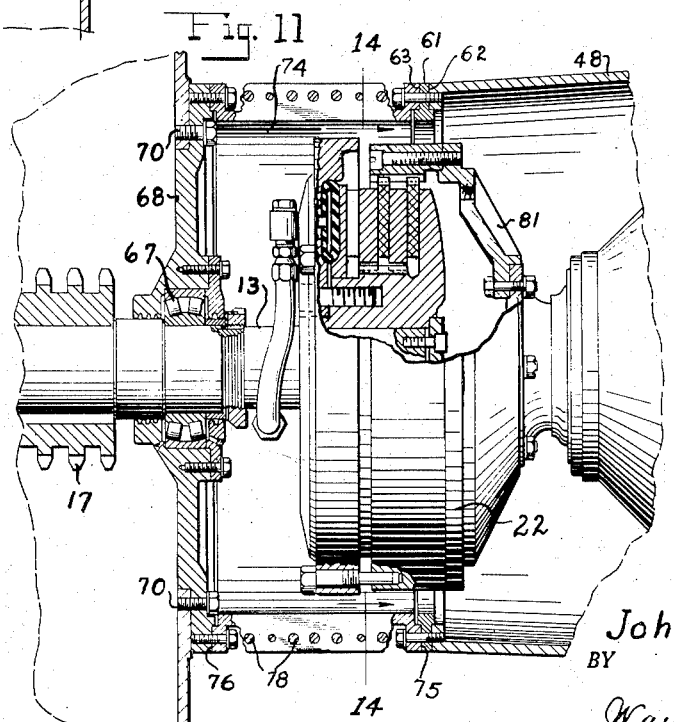

March 12, 1957 J. H. WILSON 2,784,557
ENGINE COMPOUND FOR DRILLING RIGS
Filed April 17, 1951 7 Sheets-Sheet 6

INVENTOR.
John Hart Wilson
BY
Wayland D. Keith
HIS AGENT.

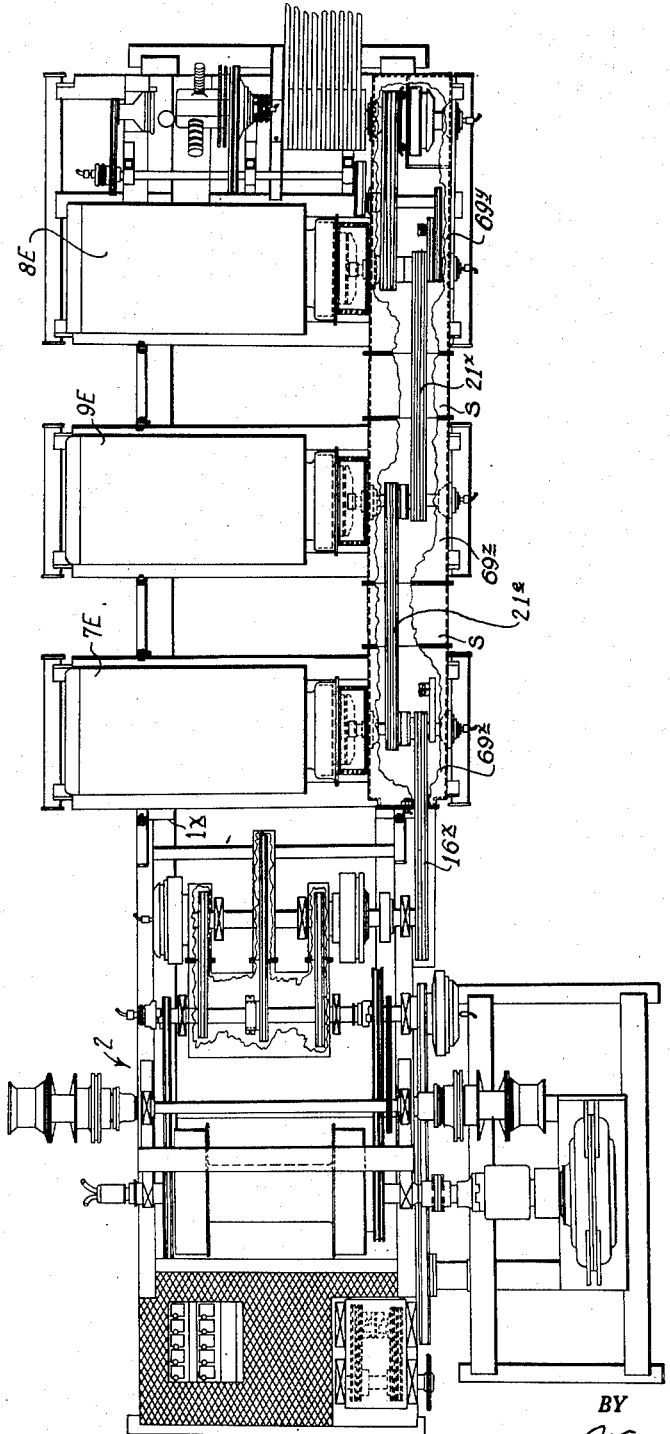

United States Patent Office 2,784,557
Patented Mar. 12, 1957

2,784,557

ENGINE COMPOUND FOR DRILLING RIGS

John Hart Wilson, Wichita Falls, Tex.

Application April 17, 1951, Serial No. 221,371

3 Claims. (Cl. 60—97)

This invention relates to improvements in engine compounds for drilling rigs, and more particularly to sectional or unit compounds whereby engines can be added within the drive system or removed therefrom, depending on the drilling requirements.

The shafts of the compound are journaled on each side of the unit compound section and extend toward the engine for connection with the engine shafts in rigid axial alignment, and once a compound shaft is aligned with the engine shaft and all parts secured in place, the various engines and their respective compound units can be disassembled and reassembled as units so the various component parts can be returned to their original position with the measuring and adjusting, usually required, being unnecessary.

The present invention is so designed as to enable two or more engines to be placed in side by side relation with the shafts of the engines and the shafts of the compounds connected in alignment, so that the unit compounds of the respective engines can be joined into multiple unit in a quick detachable manner to enable the ready assembly and disassembly thereof, and when aligned and secured in place, they will remain in aligned relation. With the engines and compounds connected together in driving relation, these may be connected to the draw-works and to the mud pump and to other ancillary equipment of the drilling rig for driving these without the use of flexible couplings for connecting the shaft extensions of the compounds to the shafts of the respective engines.

In the construction of drilling rigs and the like, it is often necessary to use two or more engines connected together in driving relation to drive the massive machinery of the drilling rig, to perform the operation of drilling oil wells. The composite arrangement of the machinery is of such great weight and size that it is impractical to move such machinery as a single unit. Each engine is preferably mounted on a skid sill frame, which skid sill frames, together with the transmission and draw works are mounted on a main frame. It is obvious that much time, labor and skill are required to locate the various engines in spaced, aligned relation to the transmission and to the draw-works, and it is therefore very desirable, once the machinery is properly positioned and aligned, to maintain such position on the main frame, but due to the fact that drilling rigs must be moved frequently, which means frequent disassembly and re-assembly of all cooperating machines in exact spaced, aligned relation to insure proper and efficient operation of the machinery, and long wear to the parts. The present arrangement enables the parts to be disassembled and reassembled on the main frame so that the engines and cooperative machinery will be in the same aligned relation it originally occupied.

It has been the practice heretofore to use flexible couplings to connect engine shafts to the compound shafts to drive the drilling rig transmission, draw-works and pumps, so any misalignment would be compensated for the flexible coupling, however, when running under heavy load, even slight misalignment results in the flexible couplings quickly becoming worn.

Furthermore, difficulty has been experienced heretofore in connecting compound shafts to the clutches, torque converters and the like into axial alignment with the engine shafts, which compound shafts were usually aligned with respect to the shaft of the transmission positioned on the main frame, and when engines were shifted with respect to the frame, the compound shafts became misaligned with respect to the engine shafts.

The present invention embodies the axial alignment of the shafts of the compounds with the shafts of the respective engines so each compound shaft will be journaled on each side of the compound member in axial alignment with the engine shaft.

On each engine skid unit a strongly reinforced box type compound case section is mounted and permanently aligned with the engine by means of a rigid cylindrical housing which joins the engine flywheel housing, or the torque converter, directly to the compound case, thus eliminates chance of misalignment.

An object of this invention is to provide an individual unit compound for each engine or prime mover so two or more engines may be connected together in driving relation with a common object to be driven, such as a pump or the draw-works of a rotary drilling rig.

Another object of this invention is to provide a unit compound arrangement whereby two or more engines may be compounded together in driving relation so that when the shafts of the engines are aligned and index stop means provided, the engines and the compound units can be removed from the main frame and replaced thereon without having to realign the compound shafts to the respective engine shafts, and the engines with respect to each other.

Still another object of this invention is to provide compound housings for connection with the respective engines and spacers for the compounds and spacers for the engines that will align, reinforce and make a rigid multiple driving unit for a rotary drilling rig.

Yet another object of this invention is to provide compound shaft bearings that are coaxially aligned with respect to the shaft of the respective engine.

A further object of this invention is to provide a cylindrical housing, which housing is interposed between an engine and a compound unit and is split along its transverse horizontal center line so that either half may be removed to provide accessibility to a clutch within said housing.

A still further object of this invention is to provide a compound arrangement whereby individual engines in compound units can be installed within the unit or removed therefrom, and the main frame lengthened or shortened as desired to accommodate the changes in the number of units used.

Still another object of the invention is to provide a unit compound for use with an engine so that the width of a compound may be varied to accommodate engines of different widths, and in which any number of sections can be utilized and to make interchangeable sectional units so as to give versatility to the use of one or more engines.

A still further object of this invention is to provide a spacing system which will enable two or more engines to be compounded together and to be maintained in spaced relation with respect to each other and with respect to the main frame so the engine and the compound shafts will be maintained in aligned relation.

The present invention as illustrated in the accompanying drawings, show a rotary drilling rig draw-works, power units, and machine elements for cooperatively connecting the engines in compound relation with the draw-works and provides an arrangement whereby the various engines or prime movers can be removed and replaced to the exact location so as to give the original alignment.

An embodiment of this invention is illustrated in the accompanying drawing, in which:

Fig. 1A is an elevational view of the form of the invention as shown in Fig. 1;

Fig. 2 is a fragmentary elevational view, with parts broken away and shown in section, of the main frame and an engine skid sill frame, and showing the lower portion of a power unit mounted on the engine skid sill frame;

Fig. 3 is a sectional view taken on the line 3—3 of Fig. 4, looking in the direction indicated by the arrows, and showing the clamping arrangement of the engine skid sill frame to the main frame, parts being shown in section;

Fig. 4 is a sectional view taken on the line 4—4 of Fig. 2, with parts broken away and shown in section, of an end of a power unit positioned on the engine skid frame and showing a spacer member between the adjacent skid sill frames of the power units, and showing engine aligning screw;

Fig. 5 is an elevational view of one of the spacer members between the engine skid sill frame and the main frame;

Fig. 6 is a top plan view of one of the spacer members shown in Fig. 5;

Fig. 7 is a vertical sectional view taken on the line 7—7 of Fig. 5, through a hinge joint of one of the spacer members;

Fig. 8 is an enlarged front elevational view of a slide bolt assembly;

Fig. 9 is an elevational view of the spacer between the skid sill frames of adjacent power units;

Fig. 10 is an enlarged top plan view, with parts broken away and shown in section, of the invention as used in connection with a torque converter and a pneumatic clutch, and showing one of the bearings of the shaft of the compound member;

Fig. 11 is a view similar to Fig. 10 but with the torque converter and extension housing removed; and showing one of the bearings of the shaft of the compound;

Fig. 15 is a detailed fragmentary view showing how the box unit member of the compound is connected to an adjacent spacer or complementary member; and Fig. 16 is a view similar to Fig. 1, but showing three engines connected together instead of two, and also showing the compound as used without the torque converters.

Figure 1:
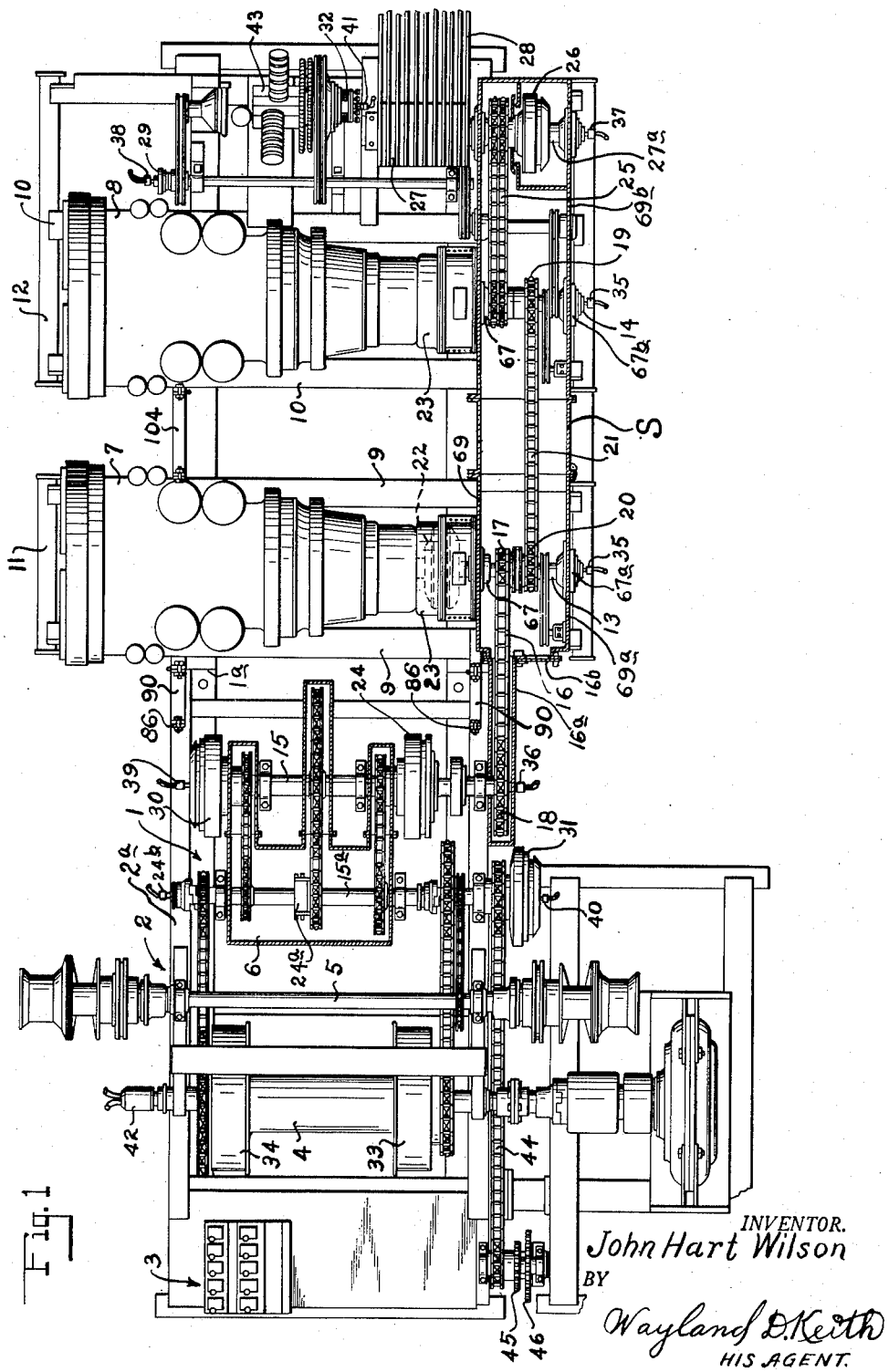
Fig. 1 is a plan view of a rotary drilling rig showing two engines and unit compound members placed in side by side relation with spacer elements interposed between the engines and the compound units, and securing the engines and compound units secured to the main frame.
Figure 12:
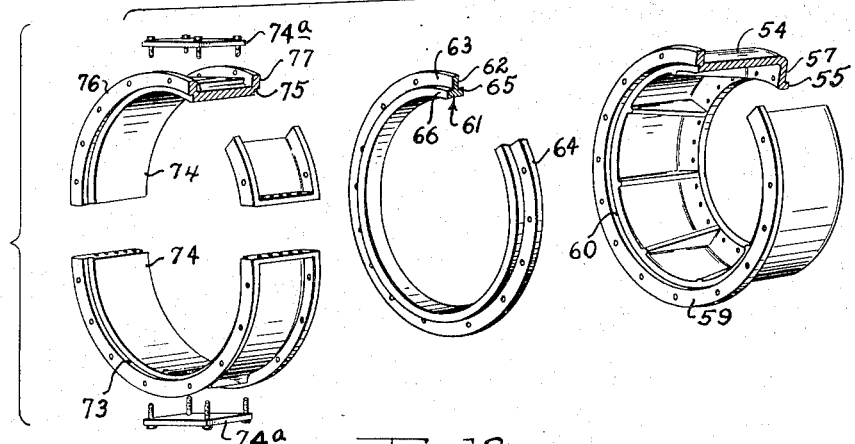
Fig. 12 is an exploded perspective view of the cylindrical housings and the connecting members, with parts broken away and shown in section, to illustrate the details of construction.
Figure 13:
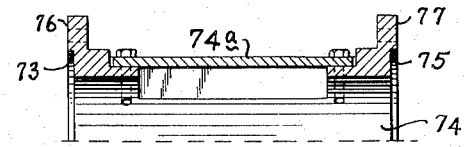
Fig. 13 is an enlarged longitudinal sectional view through the upper portion of the split housing and showing the inspection plate bolted in place.
Figure 14:
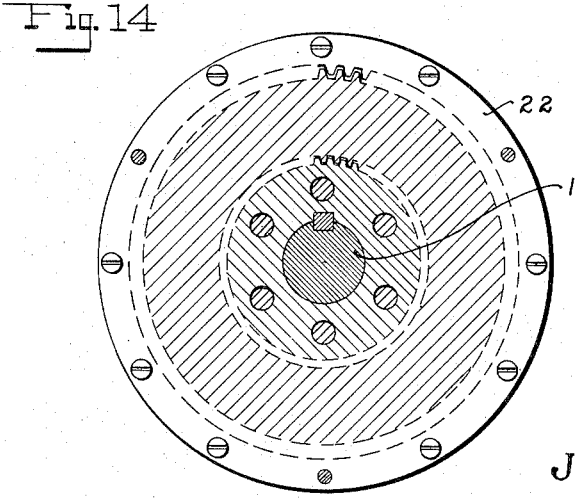
Fig. 14 is a sectional view taken on the line 14—14, between the arrows on Fig. 11, and looking in the direction thereof.

With more detailed reference to the drawing the numeral 1 designates generally the main frame of a rotary drilling rig the draw-works mechanism of which is generally designated at 2 which mechanism is mounted on sills 2a on one end of the main frame. The drilling controls are mounted on a stand 3 which is within easy access of the driller or operator. The rotary draw-works in general comprises a drum 4, cathead shaft 5, and the mechanism connected thereto for operating the driving mechanism of these and associated parts. A transmission 6 is provided with the various speed change gear ratios, which in the present instance are shown to be sprockets and chains and reverse gearing with suitable clutches to perform the various drilling operations.

In the form of the invention as shown in Figs. 1 to 15, inclusive, the main frame 1 has engines 7 and 8 mounted on the respective skid sill frames 9 and 10. The skid sill frames are made of heavy structural material, such as H beams, and have end members 11 and 12 secured across the ends of the respective pairs of skid sill frames, so as to form a separate, rigid unit for each of the engines, which units are bindingly secured to the main frame 1 of the rotary drilling rig, as will be more fully described hereinafter.

The engines 7 and 8 are mounted in spaced, side by side relation to their respective frame units which units are mounted on the main frame 1 so the compound shafts 13 and 14 will extend outward from the respective engines, which shafts will be parallel to each other and parallel to the shaft 15 of the transmission 6, and the shaft 27a that drives the pump (not shown) so that a driving chain 16 may be interconnected between sprocket 17 on shaft extension 13 and sprocket 18 on transmission shaft 15, or the chain 25 may connect with the sprocket on shaft 14 or with the sprocket on shaft 27a for driving the pump. A sprocket 19 is provided on compound shaft 14 of engine 8, which is connected to sprocket 20 positioned on compound shaft 13 of engine 7 by a drive chain 21. The sprockets 17 and 20 are secured to compound shaft 13 so that upon disengagement of clutch 22 of engine 7, the transmission shaft 15 can be driven by engine 8, or upon disengagement of a similar clutch 22 (not shown) in housing 23, connected to the engine 8, the transmission shaft 15 may be driven by engine 7, or, with both clutches 22 engaged, the power of both engines 7 and 8 may be transmitted to the transmission shaft 15 in compounded relation through drive chain 16 to drive draw-works 4. By the release of clutches 24 and 24a, which are pneumatically actuated, the transmission gearing will be disconnected, which will permit either the engine 7 or the engine 8 to drive through pump drive chain 25 and through engaged clutch 26 to drive V-belt pulley 27, which in turn, will drive through V-belts 28 to drive a mud pump (not shown) to aid in performing the drilling operation, or the power of these engines may be compounded, as described above, by engagement of both clutches 22 of the respective engines with the respective compound shafts 13 and 14, to drive the mud pump; or, by engagement of the proper clutches, both the transmission gearing elements and the pump or pumps may be driven simultaneously.

The various clutches 22, 24, 24a, 26, 29, 30, 31 and 32, which are pneumatically actuated, are supplied with air through rotary air seals, 35, 36, 24b, 37, 38, 39, 40 and 41, respectively, which seals are connected to the respective shafts on which the clutches are mounted and to a conduit that leads therefrom to a control valve on control stand 3. Each of the drum ends 33 and 34 has a pneumatically actuated clutch therein, which clutch is supplied with air through a rotary air seal connection 42 positioned on the end of the drum shaft and which have conduits leading therefrom to valves on a control stand 3, where the various conduits leading to the rotary seals are connected to an air supply system which is under pressure generated by an air compressor 43.

Each of the engines 7 or 8 may be used individually or they may be compounded together to drive through shaft 15 and shaft 15a, and with clutch 31 in engagement through rotary drive chain 44 to drive sprockets 45 and 46, to which a rotary table (not shown) may be connected to rotate the drill stem (not shown) for drilling a well.

As shown in Fig. 10, the torque converter 47 has a cylindrical housing, one end of which torque converter housing abuts with and is secured to one end of the fly wheel housing 48 by means of bolts 52. The opposite end of the torque converter housing is secured to a clutch housing extension 54 by means of bolts 53. A pair of semi-cylindrical members 74 are bolted together along their horizontal line by means of bolts 78 to form a cylindrical clutch housing, one end of which is secured to the opposite end of clutch extension housing 54 by bolts 79. An annular T-ring member 61 is formed with an outstanding rib 64 which has faces 62 and 63 on opposite sides thereof. The inner portion of the T-ring member 61 has annular pilot rings 65 and 66 protruding outward therefrom, which T-ring is interposed between the cylindrical clutch housing and the clutch extension housing and is secured in place by said bolts 79. The wall 69 of the compound housing has a face on the side adjacent the engine and has a cylindrical bore therein in which a bearing mounting plate 68 interfits, and which plate is held in secure relation by a bolt 70 passing through bearing support plate 68 screw-threaded into wall 69.

A wall 69a is provided on the opposite side of the compound housing from the wall 69, which walls support bearings 67a and 67 respectively, which bearings are mounted therein in axial alignment for journaling compound shaft 13.

The respective transverse faces of clutch housing 48, torque converter housing 47, clutch extension housing 54, T-ring member 61, semi-cylindrical clutch housing member 74, bearing support plate 68 and the face of the compound housing adjacent the engine that is complementary with the face of bearing support plate 68 are all parallel to each other and at right angles to the axis of the coaxially aligned shafts of the engine, the torque converter and compound.

The fly wheel housing 48 has a coaxial bore 50 in which an annular pilot ring 49 interfits when the face 51 of the torque converter housing is abutted with the fly wheel housing 48. An annular pilot ring 55 of the clutch housing extension member 54 interfits within an annular recess of groove 56 and when face 57 is in abutting relation with the face of the housing of the torque converter 47, the clutch extension housing 54 is held in true alignment with the torque converter housing 47 with respect thereto.

The T-ring member 61, which has face 62 is adapted to abut with the face 59 of the clutch extension housing 54 so that an annular pilot ring 65 will interfit within an annular bore 60 of the clutch extension housing.

The opposite side of the T-ring 61 has an annular pilot ring 66 that protrudes outward toward bearing support plate 68 which bearing support plate also has an annular pilot ring 72 that is co-axial with the pilot ring 66. With these housings in this position, the clutch 22 may be connected to shafts 13 and 53 to form driving relation therewith, then, the respective semicylindrical clutch housing members 74 will be positioned above and below clutch 22 and bolted together by bolts 78 so as to cause the grooves 73 and 75 in the members 74 to seat upon pilot rings 72 and 66 respectively. With the clutch housing thus in place, bolts 79 and 80 bolt the housing 74 at its respective ends to the clutch extension housing 54 and to the bearing support plate 68, and in so doing the housing forms a rigid, piloted, aligned member with respect to the shaft 13 and will enable the shaft 13 to run in true axial alignment, thus obviating the necessity of a flexible joint coupling.

With the face 71 of the bearing support plate parallel with the face 63 of the T-ring member 61, the semi-cylindrical housing members 74 may each be slipped into place so that face 76 will abut with the face 71 of the bearing support 78 and the face 77 will abut with the face 63 of the T-ring member and when the semi-cylindrical members 74 are bolted together, will position the housing so that either half may be removed and permit inspection and repair of the clutch member 22, and the other portion of the housing 74 will remain bolted in place, which will maintain the shaft 13 in true axial alignment with the shaft 53. Plates 74a are provided in each of the housing members 74, which enables certain inspections to be conducted through the openings which they cover.

When the unit is used with torque converters, the spider 81 which is bolted to a flange that is secured to the engine shaft is used as a driving member. This spider 81 has internal teeth which engage with external teeth of the drive members positioned on the shafts of the torque converters 47, so as to form a driving relation between the engine and the torque converter.

In the form of the invention as shown in Fig. 11, the circular spider is bolted to a clutch member, which clutch member has circumferentially spaced internal teeth which teeth engage the clutch plate member which has external teeth, as shown in the break-away portion of clutch 22. The clutch 22 is of the pneumatic tube type and with the split housing 74 being removable in halves, the clutch air tube may be removed and replaced without disassembly of the compound member or moving the engine, as has been the practice heretofore.

When the torque converter 47 is omitted, the face 75 of the clutch housing semi-circular ring members 74 abuts with the face 63 of the T-ring member 61 and with the face 62 thereof abutting against the face of the fly wheel housing 48, the respective parts are held in concentric relation with respect to the engine shaft and to the compound shaft 13, in the same manner as set out for the form of the invention as shown in Fig. 10. It will be seen that the only change necessary is to move the engine toward the compound unit a distance equal to the width of the torque converter 47 and the clutch extension housing 54. By the use of the T-ring member and the split, semi-cylindrical housing members 74, the shafts within the housing can be connected and maintained in true, rigid alignment with the engine shaft, which obviates the necessity of a flexible coupling, as the various shafts, once aligned and spaced by accurate measurements, are maintained in this manner.

In the leveling and aligning of the engines 7 and 8, screws 82 are provided to enable the engines to be raised or lowered, as indicated by space 85. When the engine is properly leveled, a measured number of shims 84 are interposed within the space 85 between the engine 8 and the plate 83 and the shims welded as indicated at 83', and the screws 82c screw threaded into lugs 82a welded to the engine support beams 82b. These screws enable the engines to be moved transversely, and when the engine is properly aligned, one of the screws 82c, usually the one nearest the draw-works, is tack welded so to maintain the screw in this position, but by loosening the opposite screw, the engine can be removed and replaced and will come back to the same transverse alignment.

By having the shims 84 tack welded and one of the screws 82c tack welded, both the height and the transverse alignment will be the same each time an engine is replaced after disassembly, thereby obviating the measurements which are usually necessary to align the engine with the driven machine.

Holes are drilled in engine skid sill frames 9 and 10 to receive bolts 82d, so, when the engine is placed on the skid sills, the bolts 82d will abut with the flange of the main frame member 1, as will best be seen in Figs. 2 and 3. After this is positioned in this manner, a slide bolt member 82g is positioned so that the slide bolt 82f will be in contact relation with the flange of the opposite main frame 1, whereupon, the casing of the slide bolt member 82g will be welded to the face 10a of the box sill member. This slide bolt is provided with a hole, as indicated in Figs. 4 and 8, through which a pin may be placed to hold the slide bolt 82f either in "up" position or in "down" position.

With the bolts 82d and the slide bolt 82f holding the skid sill members 10, as would be the case in the form of the invention as shown in Fig. 2, against longitudinal movement and with a clamp member 82e positioned under the bolt 82d, the skid sill members, once adjusted and set in place, will go back into the same longitudinal position each time the engine is reset, thus the engines will be in the same longitudinal relation to the main frame members 1.

When assembling the drilling rig for the first time, the rotary draw-works 2 is set in place on main frame 1, the engines, as illustrated by the engine 7 having skid sill frames 9, are positioned in place in spaced aligned relation with respect to the rotary draw-works frame 2a and with the various shafts in correct aligned relation, a unit comprising members 86, 90 and 91, that are bolted together by eye-bolts 88 and 96, is placed between the rotary frame 2a and engine skid sill frames 9 and stop members 86 are secured to frame 2a and stop members 91 is secured to skid sill 9 as by bolting or welding, depending on the particular character of the engine being mounted. This secures engine 7 in spaced relation with respect to the rotary draw-works 2. Ears 87 are welded to stop member 86 and the bolt member 88 is an eye bolt member pivoted to a pin passing therethrough, as indicatd in Figs. 5 and 6. The stop member is spaced as indicated at 89 and the spacer member 90 is machined as indicated at 92 to abut with face 89 on stop member 86. The opposite end of the spacer 90 is machined as indicated at 93 to abut with machined face 94 on stop member 91. The stop member 91 also has an eye bolt 96 pivotally mounted between ears 97 to enable swinging movement between ears 98, as will best be seen in Figs. 5 and 7. The upstanding lug members 96 are slotted to form members similar to ear members 98, so that the eyebolt may be swung into and out of engagement therewith. To insure the same spacer member will be used in the same relation each time the unit is reassembled, it is preferable to have perforated ear members 99 and 100 are welded alternately to spacer member 90 and stop member 91, and with the hinge pin 101 therethrough, as indicated in Figs. 5 and 7, the eye-bolts 88 and 96 may be loosened and swung out of their respective slots and the spacer member will be maintained in hinged relation to the stop member 91 which enables the engine to be readily removed and replaced to the exact transverse alignment with respect to the main frame 1, as it was originally positioned and with the screws 82c tack welded in place on one side of the engine and with the shims 84 tack welded in place, and with bolt 82d serving as a positive stop in one direction transversely of main frame 1, and with the stops 86 forming a positive stop longitudinally of the main frame 1, the engine 7 is thus positioned. Then additional engines, such as indicated at 8 and a unit comprising members 102 and 103 and a spacer member 104 is positioned between the skid sill frames 9 and 10 and with the engines 7 and 8 spaced apart with the shafts thereof in axial alignment and with spacer S bolted in place and with engine box compound members 69a and 69b bolted together, the engines will be maintained in spaced relation after which the various clamping lugs, indicated generally at 82e may be securely clamped in place. The stop members 102 and 103 are similar to the stop members 86 and 91 and the spacer member is similar to spacer member 90. The eye-bolts 105 and 106 are provided for bindingly engaging the spacer 104 to stop member 103 and stop member 102 respectively. The spacer member has lugs 108 on opposite ends thereof, which lugs are slotted to swingably receive eye-bolts 105 and 106 in the same manner as disclosed for the equivalent members in Fig. 6. The members 107 and 108 are machined so as to enable precision fitting of the various parts together. Perforated ears 109 and 110 are welded or otherwise secured to stop member 103 and spacer member 104 so as to form a hinge with pivot pin 11 therethrough.

It will be seen that with the various engine units, as illustrated by engines 7 and 8, mounted in side by side relation and spaced, braced and aligned with respect to the rotary draw-works 2 and fixed against transverse movement and with the various component parts detachably assembled with unit bracing members that are secured in place to be returned to the respective positions, that the entire unit may be dis-assembled and reassembled without the necessity of making measurements to obtain the corect alignment of the parts, as all parts reassemble in the same place and in the same relation. By having the engine compound member aligned with respect to the individual engine units, engines may be dispensed with to make a smaller unit for drilling shallow wells, or engines may be added to make a larger driving unit for heavy duty drilling, thus it will be seen that the unit is flexible for all types of work and for dis-assembly and reassembly and ease of transportation. Heretofore it has been the custom to have a compound unit built integral to accommodate the particular number of engines being used, and if the unit was designed originally for four or for six engines all of these engines had to remain connected into the unit, whereas with the present unit, if built to accommodate three or four engines, any of these may be removed, replaced or added to the particular box compound unit connected to the engines. Additional engines are added between the first and last engines by merely adding spacers S and lengtheining the main frame 1 to accommodate the number of engines used.

Figure 16 shows the manner in which three engines are connected together by interposing engine 9E between engines 7E and 8E. The main frame 1 may be lengthened accordingly by welding a piece thereinto, of the desired length. If the frame becomes so long as to be unwieldy, it may be split and bolted together, as indicated at 1a and 1x and indicated in Figs. 1 and 16, respectively.

The form of the invention as shown in Fig. 16 is similar to the form of the invention as shown in Fig. 1 except engines 7E, 8E and 9E, as shown, are positioned in side by side relation and are all interconnected in geared relation by means of chains 21e and 21x. The box compound housings are designated as 69x, 69y and 69z. The compound members have spacers S interposed therebetween which are connected with the respective box compound housings by a hinged eye-bolt B that swings into and out of slots C, as shown in detail in Fig. 15. It is preferable to have a sealing gasket positioned between spacers S and the faces of the respective compound housing so the compound housing will retain lubricant therein.

The form of the invention, as shown in Fig. 16, shows engines 7E, 8E, and 9E without torque converters, which is the form of the invention as shown in Fig. 11, however, it is to be understood that two or more engines can be used either with or without torque converters, and that torque converters can be added or removed in the field, without any change to the compound members designated at 69x, 69y, and 69z, with spacers S interposed therebetween. Should it be desired to add extra engines to the form of the invention as shown in Figs. 1 and 1A, it is necessary only to cut the main frame 1 and add a length of structural beam of such length as one engine, such as 9E and one spacer S would occupy, whereupon, a form of the invention substantially as shown in Fig. 16, may be added, however, when an odd number of engines is added, it will necessitate a slightly different arrangement of the chains 21e and 21x. However, additional units similar to 9E may be added either by utilizing longer main frames 1 or by splicing the existing main frames, as desired, to which the desired number of engines may be added. It has been found, however, that from one to six engines may be used without altering anything but the basic length of the main frame, and substituting a chain arrangement which is in conformity to the number of engines used.

Provision is made for shifting chain 16, as shown in Fig. 1 to the position 16x as shown in Fig. 16 by merely changing places with the chain housing 16a and cover plate 16b as shown in Fig. 1.

The form of the invention as shown in Fig. 16 will be referred to by like numbers on all parts that are identical and do not change their relationship to those of the form of the invention as shown in Figs. 1 to 15, inclusive.

Having thus clearly shown and described the invention, what is claimed as new and desired to secure by Letters Patent is:

1. In a sectional compound for a multiple engine drive unit an elongated main frame, engines, each of which has a shaft therein, positioned transversely of said main frame with the respective shafts thereof in parallel alignment, each of said engines having a drive element secured to its respective shaft in such manner that said drive elements will be in alignment, means for interconnecting said aligned drive elements in driving relation, a separate housing for each of said drive elements each of which housings is directly secured to the respective engine, spacer means at one end of said engine, other spacer means near the opposite end of said engine so as to enable the variable spacing of said engines, spacer means directly interconnecting said housings, means for connecting said spacers to said housings, so as to maintain said engines in spaced aligned relation.

2. In a sectional compound for a multiple engine drive unit, an elongated main frame, engines, each of which has a shaft therein, positioned transversely of said main frame with the respective shafts thereof in parallel alignment, each of said engines having a drive element secured to its respective shaft in such manner that said drive elements will be in alignment, means for interconnecting said aligned drive elements in driving relation, a separate housing surrounding each of said drive elements spaced longitudinally from an end of said engine, an annular ring having an upstanding rib and an outstanding pilot ring on each side thereof one end of which pilot ring is fitted in an end of said engine, each of said housings having a pilot ring therearound, horizontally split members positioned between said annular ring and housing so as to interengage said pilot rings so as to axially align said engine and said housing, means for attachably securing said split members in place so any portion may be removed, and means directly connecting said housings together to maintain said engines in spaced aligned relation.

3. In a sectional compound for a multiple engine drive unit, an elongated main frame, engines, each of which has a shaft therein, positioned transversely of said main frame with the respective shafts thereof in parallel alignment, a compound shaft coaxially aligned with each of the engine shafts, a clutch member interposed between said engine shaft and said compound shaft and operatively connected to said shafts, a drive element secured to each of the respective compound shafts in such manner that the drive elements will be in transverse alignment, means for interconnecting said drive elements in driving relation, a separate housing enclosing each of said drive elements, a bearing mounted in said housing on each side of said drive element and journaling said compound shaft, a T-member having an outwardly projecting rib and laterally projecting pilot rings interconnecting with an engine fly wheel housing adjacent an end of said engine, with one of said pilot rings protruding outwardly toward said clutch, said drive element housing having a pilot ring protruding outwardly toward said clutch, said pilot rings being coaxial with said compound shaft and said engine shaft, a pair of semi-cylindrical members adapted to interfit between said drive element housing and said T-ring member in close fitting relation on said pilot rings, bolt means for securing said semi-cylindrical members together to form a clutch housing, further bolt means for securing the respective ends of said clutch housing to said drive element housing and to an end of said fly wheel housing so as to form an aligning member to maintain said engine shaft and said compound shaft in rigid axial alignment, and means directly connecting said drive element housings together to maintain said engines in spaced aligned relation.

References Cited in the file of this patent

UNITED STATES PATENTS

| | | |
|---|---|---|
| 1,125,172 | Rateau | Jan. 19, 1915 |
| 1,858,911 | Zerbi | May 17, 1932 |
| 2,171,994 | Riise | Sept. 5, 1939 |
| 2,204,877 | Anderson | June 18, 1940 |
| 2,344,681 | Deschner | Mar. 21, 1944 |
| 2,509,039 | Hennig | May 23, 1950 |
| 2,536,483 | Young | Jan. 2, 1951 |
| 2,589,121 | O'Leary | Mar. 11, 1952 |
| 2,613,059 | Maier | Oct. 7, 1952 |
| 2,639,630 | Spalding | May 26, 1953 |